United States Patent [19]

Schiraldi

[11] Patent Number: 5,328,934
[45] Date of Patent: Jul. 12, 1994

[54] RECYCLING CELLULOSE ESTERS FROM THE WASTE FROM CIGARETTE MANUFACTURE

[75] Inventor: David A. Schiraldi, Charlotte, N.C.

[73] Assignee: Hoechst Celanese Corporation, Somerville, N.J.

[21] Appl. No.: 967,088

[22] Filed: Oct. 27, 1992

[51] Int. Cl.$^5$ .................. C08J 11/02; C08J 11/04; C08J 11/06; C08J 11/08
[52] U.S. Cl. .................. 521/40; 521/48; 536/69; 536/76; 536/127
[58] Field of Search ............ 210/151; 521/40, 48; 536/127, 76, 69

[56] References Cited

U.S. PATENT DOCUMENTS

| | | | |
|---|---|---|---|
| 2,040,801 | 5/1936 | Billing | 526/37 |
| 3,224,451 | 12/1965 | Dearsley | 131/20 |
| 4,160,653 | 7/1979 | Williams | 210/173 |
| 4,261,790 | 4/1981 | Brinker et al. | 156/584 |
| 4,298,013 | 11/1981 | Semp et al. | 131/308 |
| 4,308,200 | 12/1981 | Fremont | 260/110 |
| 4,457,317 | 7/1984 | Thompson et al. | 131/96 |
| 4,493,797 | 1/1985 | Monteyne | 210/236 |
| 4,675,198 | 6/1987 | Sevenants | 426/425 |
| 4,909,868 | 3/1990 | Melvin | 264/3.4 |
| 4,964,995 | 10/1990 | Chum et al. | 210/634 |
| 5,009,746 | 4/1991 | Hossain et al. | 162/5 |

*Primary Examiner*—John Kight, III
*Assistant Examiner*—Jeffrey Culpeper Mullis
*Attorney, Agent, or Firm*—R. H. Hammer, III

[57] ABSTRACT

A process for recycling waste from the manufacture filtered cigarettes is disclosed herein. The process comprises the following steps: A waste stream from the manufacture of filtered cigarettes is provided. The waste stream includes tobacco, cellulose ester polymer, and paper. A substantial portion of the cellulose ester polymer is separated from this waste stream. This cellulose ester polymer is contacted with a sufficient volumne of fluid to extract contaminants therefrom. The fluid is under pressure and temperature conditions, such that the fluid is a supercritical or a near supercritical fluid.

8 Claims, No Drawings

RECYCLING CELLULOSE ESTERS FROM THE WASTE FROM CIGARETTE MANUFACTURE

FIELD OF THE INVENTION

This invention is directed to recycling waste, particularly cellulose esters, generated during the manufacture of filtered cigarettes.

BACKGROUND OF THE INVENTION

Fibrous cellulose esters, particularly cellulose acetate, are the commercially preferred media for filtration of smoke from filtered cigarettes. This commercial application consumes worldwide several hundred million pounds of cellulose acetate fiber per year. During the production of these filtered cigarettes, a certain percentage of them will not be brought to market, due to damage of goods, variation from specifications, or other reasons. Those cigarettes which are not sold are typically subjected to a reclamation process wherein the tobacco-laden portion of the cigarette is mechanically broken from the filter, and the tobacco is removed by shaking within a screening device. An example of this process is given in U.S. Pat. No. 3,224,451, which is incorporated herein by reference. After reclamation of tobacco, several tens of millions of pounds of residual material, referred to as "ripper waste" in the industry, comprised of cellulose acetate (typically plasticized for example with glycerol triacetate), paper, residual tobacco, and often flavors and fragrances remain; this ripper waste is most generally disposed of as landfill, representing both a loss of natural resources and a burden on landfill capacity.

The composition of "ripper waste" varies depending on the specifics of the cigarette products and the tobacco reclamation process employed. Typical composition ranges, by weight, of ripper waste are: a) cellulose acetate, 40–55%; b) plasticizer, 1–12%; c) paper, 25–45%; d) residual tobacco, 1–15%; e) adhesives, 2–3%; and f) flavors/fragrances, <1%. Additional components for example charcoal, may be found in these waste streams, depending on the specific cigarette product.

The physical/mechanical separations employed in reclaiming cigarette components have in the past either focused on sifting tobacco away from other components, as is the case in U.S. Pat. No. 3,224,451, or in the removal of cellulose acetate filter media from its paper liner, as in U.S. Pat. No. 4,261,790, which is incorporated herein by reference. Other approaches have included enzymatic degradation of the cellulose acetate to produce useful sugars, as in U.S. Pat. No. 4,298,013.

Isolation of cellulose acetate from "ripper waste" is insufficient to provide a recycled product of high commercial utility. During the manufacture of cigarettes, the cellulose acetate is treated with a plasticizer which improves the mechanical performance of the finished filter. The cellulose acetate may also be treated with flavorants, for example menthol, and the cellulose acetate will absorb some levels of nicotine and other substances from the tobacco. If the cellulose acetate/plasticizer/flavors mixture is dissolved in a typical cellulose ester solvent, and reformed into a product, these extraneous substances will change both the mechanical and the sensory properties of the cellulose acetate, thereby reducing the overall quality of products manufactured with these recycled materials. Extraction with conventional solvents, such as ethanol, can be used to remove the majority of undesirable contaminants from cellulose acetate. But, the extraction solvents then becomes an undesirable contaminant, and reduces the product quality. An additional difficulty introduced by use of such extraction solvent is that they can escape into the environment, necessitating costly preventative measures.

Supercritical and near supercritical fluids have previously been described for the extraction of: removal of adhesives from cellulose (See, U.S. 5,009,746); terpenes and oils from wood (See, U.S. Pat. No. 4,308,200); lignin from Kraft streams (See, U.S. Pat. No. 4,493,797); and removal of the natural oils from plant matter (See, U.S. Pat. No. 4,675,198). Commercial applications of this technique include: the decaffination of coffee and tea; extraction of hops flavors for beer manufacture; and denicotination of tobacco. Such commercial processes are well known to those skilled in the art and are described in reviews such as: McHugh and Krukonis, *Supercritical Fluid Extraction: Principles and Practice*, Butterworths; (1986); Eckerd et al., Environmental Science and Technology, Vol. 20, pp. 319-325, (1986); "Supercritical Fluids", *Kirk-Othmer Encyclopedia of Chemical Technology* 3rd, John Wiley & Son, New York, each of the foregoing are incorporated herein by reference.

While the supercritical extraction of natural products from cellulose is described U.S. Pat. No. 5,009,746, it does not describe the removal of polymeric additives and impurities from cellulose acetate. Those familiar with the chemistry, binding properties, and solution properties of both cellulose acetate and cellulose will recognize that these two structural polymers share few common properties, and, therefore, must therefore be treated as different materials. See, "Cellulose" and "Cellulose Acetate" *Kirk-Othmer Encyclopedia of Chemical Technology* 3rd, John Wiley & Sons, New York, both of which are incorporated here in by reference.

SUMMARY OF THE INVENTION

A process for recycling waste from the manufacture of filtered cigarettes is disclosed herein. The process comprises the following steps: A waste stream from the manufacture of filtered cigarettes is provided. The waste stream includes tobacco, cellulose ester polymer, and paper. A substantial portion of the cellulose ester polymer is separated from this waste stream. The cellulose ester polymer is contacted with a sufficient volume of fluid to extract contaminants therefrom. The fluid is under pressure and temperature conditions, such that the fluid is a supercritical or a near supercritical fluid.

DETAILED DESCRIPTION OF THE INVENTION

The present invention, which is directed to a process for recycling the waste from the manufacture of filtered cigarettes, is set forth in greater detail below.

The waste stream from the manufacture of filtered cigarettes comprises generally tobacco, paper, and cellulose ester filter material This waste stream maybe "ripper waste" as discussed above, or maybe the entire broken filtered cigarettes (the differences between the latter and the former being that the latter would have a greater tobacco content). The cellulose ester filter material typically comprises a fibrous form of cellulose acetate, which is referred to in the industry as "TOW" and various "contaminants" discussed below.

The cellulose ester filter material or polymer generally comprises cellulose acetate (acetyl value of about 40.3%), but may also include other conventionally known or commercially available cellulose esters. The cellulose acetate filters are typically "contaminated" with plasticizers, adhesives, and flavors/fragrances during the manufacture of both the filter tips and the filtered cigarettes. Exemplary plasticizers include, but are not limited to, triacetin (also known as glycerol triacetate), trimethylene glycol diacetate (also known as TEGDA), and mixtures thereof. Exemplary adhesives include, but are not limited to, polyvinyl acetate (PVA), ethylene vinyl acetate (EVA), cellulose acetate, and mixtures thereof. The flavors/fragrances may be absorbed by the filter material from the tobacco, for example, nicotine, or may be added, for example, menthol. Prior to recycling the "contaminated" ester polymer with "virgin" cellulose ester polymer, the contaminants must be removed or significantly reduced.

Preferably, before the contaminants are removed from cellulose ester polymer, the cellulose ester polymer is removed from the waste stream. The weight content of tobacco in the cellulose ester polymer, after the separation, should be less than about 1% by weight. Optimally, the weight content of tobacco in the cellulose ester polymer should be less than about 0.1% by weight.

Any conventional means maybe used for separating the cellulose ester polymer from the waste stream. Exemplary methods include: manually separating tobacco and paper from the cellulose ester polymer; screening or sifting paper and tobacco from the cellulose ester polymer; and cycloning or elutriating the paper and tobacco from cellulose ester polymer. Elutriation by air is the preferred method for separating the cellulose ester polymer from the waste stream.

Optionally, the waste stream, either before or after the foregoing separation, maybe subjected to any conventional particle size reduction process. These particle size reduction process facilitate separation, as well as, the extraction, as is known to those of ordinary skill in the art. Such processes include, but are not limited to, grinding, chopping, milling, and pelletizing.

The contaminants are cleansed from the cellulose ester polymer by contacting the polymer with a sufficient volume of fluid to extract the contaminants therefrom. The fluid is under pressure and temperature conditions, so that the fluid is a supercritical or a near supercritical fluid.

A supercritical fluid exists at or above its "triple point". The triple point is the temperature and pressure at which the solid, liquid, and vapor (gas) of a substance are in equilibrium with one another. A supercritical fluid possesses approximately the penetration properties of a gas simultaneously with the solvent properties of a liquid. Accordingly, supercritical fluid extraction has the benefit of high penetrability and good solvation. Exemplary fluids included, but are not limited to, carbon dioxide and propane. Other fluids are listed in the "Supercritical Fluids" section of *Kirk-Othmer*, Ibid., at Table 2, which is incorporated herein by reference. The preferred fluid is carbon dioxide which has a triple point at 30° C. and 72.9 atmospheres (about 1072 psig).

In the preferred embodiment, cellulose ester polymer is contacted with carbon dioxide within the pressure ranges of about 1400 psia to about 10,000 psia and within the temperature range of about 20° C. to about 80° C.

The supercritical or near supercritical fluid extracts the contaminants from the cellulose ester polymer. This remaining cellulose ester polymer is of sufficiently good quality that it can be resolvated and used as "virgin" polymer or with "virgin" polymer. However, if necessary, this recycled polymer could be subjected to further separation if residual tobacco or paper remain. The contaminants which are held in the fluid are released when the fluid is expanded. The contaminants are then collected and disposed of. The expanded fluid may be compressed and then recycled back into the process.

Without limiting the foregoing invention, in any manner, it is further illustrated by way of the following examples.

EXAMPLE 1

This example illustrates the separation of the waste stream, i.e. "ripper waste" from a cigarette manufacturing operation. The waste stream comprised, in major components, tobacco, paper and filter tips (fibrous cellulose acetate). A total of 295 pounds of this waste was separated into its three major components. The final weight of each component stream is as follows: 66.5 pounds— tobacco; 65 pounds—paper; and 163.5 pounds—filter tips.

The separation was accomplished by means of air elutriation. A commercially available elutriator, Sterling Model 1608EL from Sterling Blower Company of Lynchburg, VA, was used. It was operated with air at 5000 feet per minute.

295 pounds of waste product was introduced into the elutriator for a first pass of separation. At the end of this pass, a mixture of 61 pounds—tobacco and 48 pounds—paper was removed from the remaining mass. The mixture of tobacco and paper was separated into its components by use of a conventional shaker screen device, as is well known.

The remaining mass was reintroduced into the elutriator for a second pass. At the end of this pass, a mixture of 5 pounds —tobacco and 10 pounds—paper was removed and farther resolved into components by the shaker screen method noted above.

The remaining mass from the second pass was reintroduced into the elutriator for a third pass. At the end of this pass, a mixture of 0.5 pounds tobacco and 7 pounds paper was removed and separated as before. The remaining mass, which weighted 163.5 pounds, consisted primarily of filter tips, but included trace amounts of tobacco and paper as was apparent by visual inspection.

EXAMPLE 2

The waste product with tobacco and paper removed, for example in the manner set forth in Example 1, consisted substantially of filter tips from cigarettes. The contaminants in this material were removed via an extraction technique using supercritical carbon dioxide.

The filter tip waste, prior to extraction, was analyzed to quantify contaminant levels. Using conventional gas chromatography techniques, the amount of plasticizer (glycerol triacetate) was measured at 7.59% by weight. Using industry acceptable techniques, the samples were observed to possess a strong tobacco odor and taste.

The range of conditions for the extractions are set forth in Table 1. Additionally, a weight ratio of carbon dioxide:cellulose acetate of 120:1 was utilized.

TABLE 1

| Serial No. | Temperature (°C.) | Pressure (psia) | Weight of Sample Loaded (gms) | Weight Fraction Extracted |
|---|---|---|---|---|
| A-1 | 45 | 2000 | 2.4136 | 0.08734 |
| A-2 | | 3000 | 2.2810 | 0.09698 |
| A-3 | | 4000 | 2.6014 | 0.09349 |
| B-1 | 80 | 2000 | 2.5298 | 0.08546 |
| B-2 | | 3000 | 2.4800 | 0.08952 |
| B-3 | | 4000 | 2.5826 | 0.09820 |
| B-4 | | 4000 | 1.2654 | 0.09278 |
| B-5 | | 4500 | 1.2916 | 0.10514 |
| C-1 | 80 | 1500 | 2.2852 | 0.04551 |
| C-2 | | 3000 | 2.3222 | 0.08888 |
| C-3 | | 4000 | 2.3908 | 0.10013 |

After extraction, samples, when analyzed by the foregoing techniques, showed no trace of the plasticizer (detection limit of the instrument was 0.0001%) and no trace of the odor nor the taste.

I claim:

1. A process for recycling the waste from the manufacture of filtered cigarettes, said process comprising the steps of:
   providing a waste stream from the manufacture of filtered cigarettes, the waste stream including tobacco, cellulose acetate polymer, and paper;
   separating a substantial portion of the cellulose acetate polymer from the waste stream; and
   contacting the cellulose acetate polymer with a sufficient volume of fluid to extract contaminants therefrom; the fluid being under pressure and temperature conditions such that the fluid is a supercritical or near supercritical fluid.

2. The process according to claim 1 wherein the separating is accomplished by means of air elutriation.

3. The process according to claim 1 wherein during separating the tobacco content in the cellulose acetate polymer is reduced to less than about 1% by weight.

4. The process according to claim 1 further comprising the step of reducing the particle size of the waste stream.

5. The process according to claim 1 wherein said fluid is carbon dioxide.

6. The process according to claim 5 wherein the contacting ratio of carbon dioxide to cellulose acetate polymer is 120:1.

7. The process according to claim 5 wherein the temperature of the fluid ranges from about 20° C. to about 80° C.

8. The process according to claim 5 wherein the pressure of the fluid ranges from about 1400 psia to about 10,000 psia.

* * * * *